June 25, 1957  H. G. LEUPOLD  2,797,272
INDICATING CONTROL

Filed Aug. 23, 1954  3 Sheets—Sheet 1

Inventor
Henry G. Leupold
by Robert Cushman Crown
Att'ys

Inventor
Henry G. Leupold
by Robert Cushman Corwin
Att'ys

June 25, 1957  H. G. LEUPOLD  2,797,272
INDICATING CONTROL

Filed Aug. 23, 1954  3 Sheets-Sheet 3

Inventor
Henry G. Leupold
by Roberts Cushman & Grace
Att'ys

United States Patent Office 2,797,272
Patented June 25, 1957

2,797,272

INDICATING CONTROL

Henry G. Leupold, Arlington, Mass., assignor to United Electric Controls Company, Watertown, Mass., a corporation of Massachusetts Application August 23, 1954, Serial No. 451,653

12 Claims. (Cl. 200—56)

This invention pertains to indicating controls, herein illustrated, by way of example, as of the remote reading type and such as are employed for automatically controlling apparatus, for instance ovens, incubators, test chambers, packaging machines, moulding machines, dough conditioners, and in general, gas, liquid or metal temperatures, in response to temperature or fluid pressure variations, and with provision for indicating the instant temperature, fluid pressure or the like, and including means for setting the control to respond to different conditions within a predetermined range. Herein, for purpose of illustration but without limitation, the instrument is shown and will be described with reference to its embodiment in a thermostat for use in controlling apparatus remote from the instrument itself.

Instruments of this kind commonly employ a pressure motor for actuating the movable parts. The motor most commonly used for this purpose is a metallic bellows which is connected by a capillary tube to a bulb or the like, externally exposed to physical variations in an ambient medium at the apparatus to be controlled, the bulb, tube and bellows being filled with a fluid, usually a liquid. In a thermometer, said liquid would have a high coefficient of thermal expansion. Since the capillary tube may be of very substantial length, and since the materials customarily employed in manufacturing the bellows, bulb and tube cannot be depended upon always to have exactly the same dimensions or other physical characteristics, it is substantially impossible, as a practical matter, to prepare such a motor unit on a mass production scale, with the assurance that each such assemblage of parts will respond to exactly the same extent to a given temperature condition. Thus, it becomes necessary to calibrate each instrument individually after assemblage of its parts. As such instruments are usually constructed, such calibration requires repeated removal and replacement of some part of the instrument case, as well as of some of the interior elements, or at least the relative adjustment of some of the interior elements, in order, by such a cut-and-try procedure, to adjust the indicating means so as accurately to show the instant temperature at the bulb and so that the electrical switch or other part which is to be moved by the pressure motor, will directly and accurately respond to a certain temperature differential.

One object of the present invention is to provide a control instrument of the above type having provision for calibration, after all of the parts of the instrument, including the outside case, have been assembled and so that the calibration may be done with all the requisite accuracy and in a fraction of the time commonly necessary for this purpose.

In control devices of the above type it is usual to provide an adjustment whereby the upper and/or lower limit of the range of operation may be varied at will, for example, in a thermostat for the purpose of fixing the temperature at which a certain operation will take place. However, such an adjustment is of no value as a means for calibrating the instrument prior to its shipment from the factory to compensate for idiosyncrasies in the motor unit. Thus a further object of the present invention is to provide an instrument of the above type in which bodily movement of the bellows is available for calibrating the instrument initially, while other means is provided for varying the limits of the temperature range. A further object is to provide an instrument having independent means for calibrating and for varying the limits of its range so designed that the calibration and/or limit variation may be made independently, from the exterior of the instrument case after all of its parts have been assembled, without necessitating a cut-and-try process for accomplishing the desired result.

A further object is to provide such an instrument which automatically adjusts itself to compensate for variations in physical characteristics of the ambient medium surrounding the instrument case. Since such instruments are often located at substantial elevations from the floor or in other situations such that the observer's eyes cannot be directly in front of the instrument, and since it is customary, in such instruments to employ a fixed dial with a pointer which is spaced forwardly from the dial, the accurate reading of the instrument is often made very difficult by a parallax situation due to the necessity for viewing the index and dial from an angle.

A further object of the present invention is to provide an instrument of the above type wherein the above difficulties with respect to viewing and reading the instrument are substantially eliminated so that the instrument may readily be read from almost any position of observation.

A further object is to provide an instrument of the above type so devised that both the temperature setting and the instantaneous temperature reading are easily and accurately determined from points not directly in front of the instrument.

Other objects and further advantages of the invention will be pointed out in the following more detailed description and by reference to the accompanying drawings, wherein.

Figure 3:
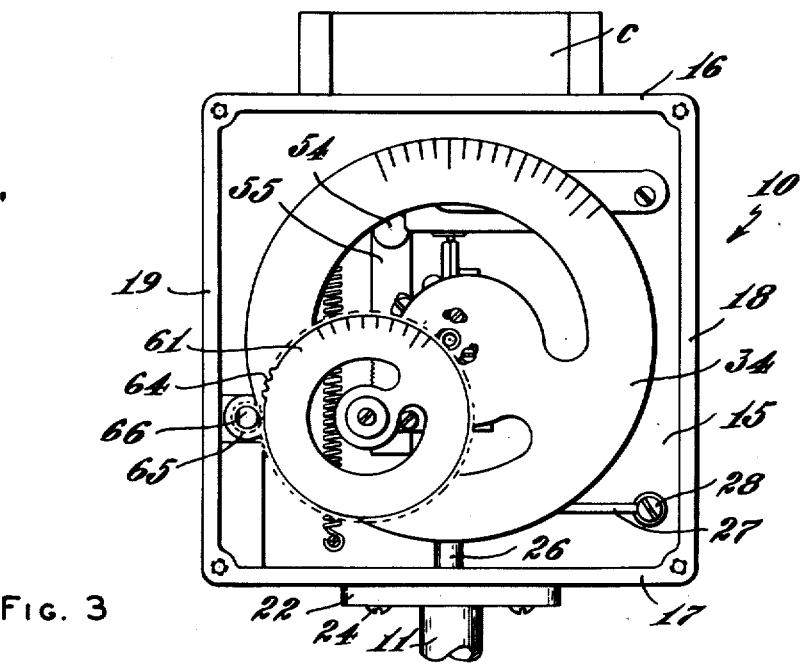
Fig. 3 is a front view of the instrument with the front member of the casing removed.
Figure 4:
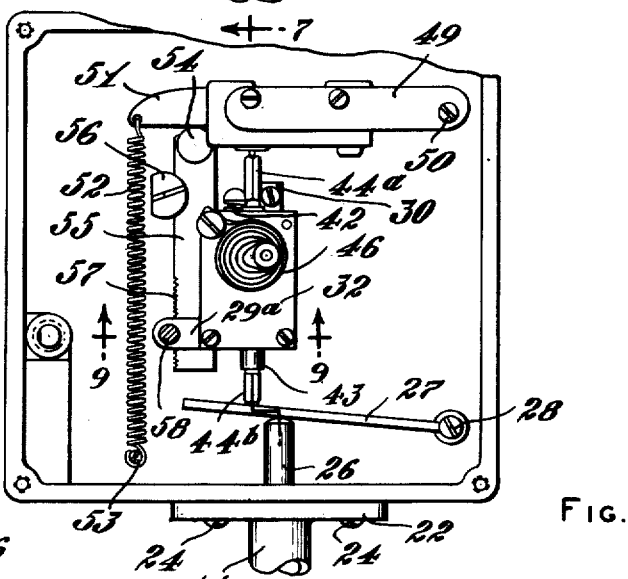
Fig. 4 is a view similar to Fig. 3, with parts broken away, and with the dials removed to show some of the operative parts to the rear of the dials.
Figure 7:
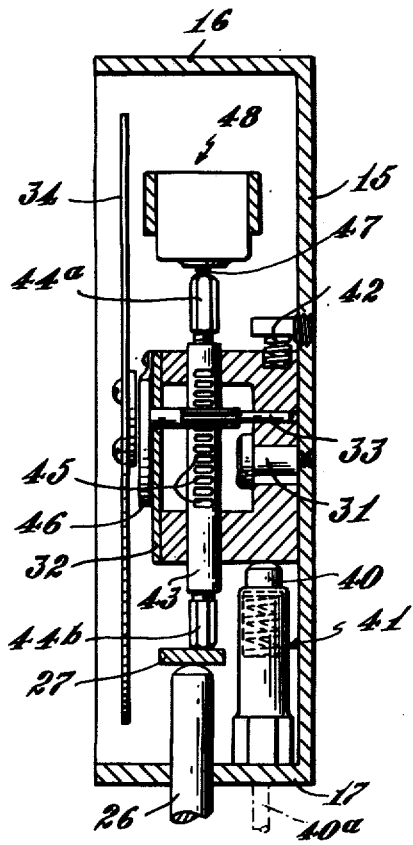
Fig. 7 is a fragmentary vertical section, to larger scale, on the line 7—7 of Fig. 4.

Referring to the drawings, the numeral 10 designates the casing of the control instrument of the present invention. This casing, as more particularly illustrated in Figs. 3, 4 and 7 comprises a hollow casting, for instance of aluminum or a plastic, here shown as of rectangular shape in front elevation, having the back wall 15, the top wall 16, the bottom wall 17 and the right and left side walls 18 and 19 respectively, the front of this casting being open. A removable cover plate 20 is normally secured to the casting by screws 21 or other appropriate fastening means.

Figure 5:
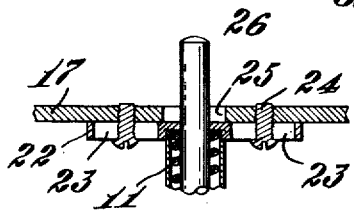
Fig. 5 is a fragmentary section on the line 5—5 of Fig. 2.

The instrument also comprises an auxiliary casing or housing 11 (Fig. 1) secured to the bottom wall 17, this housing containing a motor device M (Fig. 1) which may, for example, be like that disclosed in the patent to Leupold, 2,411,796, dated November 26, 1946. This motor device is in the nature of a metallic bellows to which a tube 12 of any desired length and usually of flexible material is connected, the opposite end of the tube being connected to a bulb 13 or other suitable container which is located within the space whose physical condition, for example pressure or temperature, varies, the instrument of the present invention responding to such variations so as to control the operation of certain apparatus not herein shown, and at the same time to indicate visually the physical conditions at the location of the bulb 13. As more particularly shown in Figs. 2 and 5, the motor housing 11 is provided at its upper end with a rigid flange 22 which underlies the bottom wall 17 of the casing 10, this flange having elongate slots 23 which receive screws 24 by means of which the motor housing is adjustably secured to the bottom wall 17 so that it may be moved bodily from right to left and then firmly held in position by tightening the screws 24. A rigid motion-transmitting rod 26, whose lower end rests upon the upper movable head of the motor device M, extends up through an opening 25 in the bottom wall 17 of the housing, the upper end of this rod 26 contacting the undersurface of an elongate lever 27 (Fig. 4) which is pivotally supported by a shoulder-screw 28 having threaded engagement with the rear wall of the casing, the axis of this screw being in a horizontal plane perpendicular to the axis of the rod 26.

Figure 9:
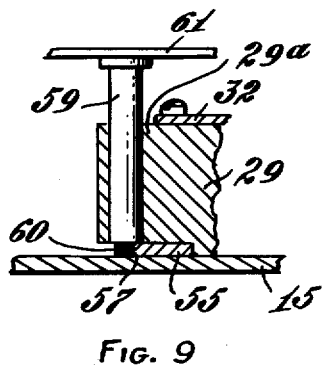
Fig. 9 is a fragmentary horizontal section looking upwardly along the line 9—9 of Fig. 4.

Within the casing there is arranged a vertically movable hollow block 29 (Figs. 4 and 9) having an elongate vertical slot in its rear wall which receives a rigid guide member 30 fixed to the inner surface of the rear wall 15 of the casing, the block being held in assembled relation to the casing by means of a screw 31 passing through a vertically elongate slot in the block. The undersurface of the block 29 rests upon the vertically movable element 40 of a motor device 41 which may for example, be a bellows-type thermometer or aneroid barometer, according to the conditions to which the instrument is intended to respond, this device 41 being designed to compensate for variations in physical conditions in the ambient atmosphere surrounding the instrument, the arrangement being such that as the part 40 rises and falls it correspondingly adjusts the block 29 up and down automatically, the block being urged downwardly by a spring 42 in addition to its own weight. If it be desired to compensate for uncontrollable temperature conditions, at other points, for example, in the ambient air surrounding a long capillary tube 12, the expansible element of the motor device 41 may be connected to a fluid-filled capillary tube 40ª (Fig. 7) extending to or through the region wherein such temperature changes occur.

Figure 1:
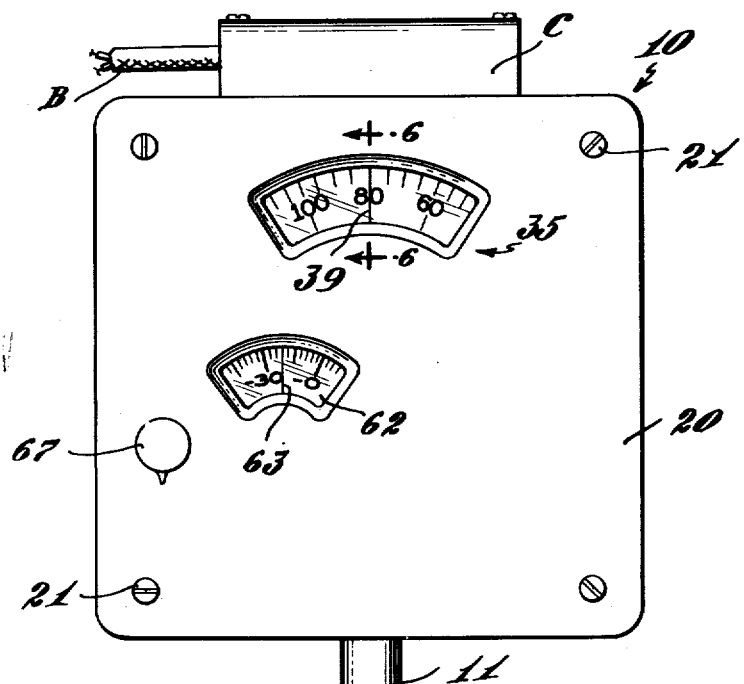
Fig. 1 is a front elevation of an instrument embodying the present invention.
Figure 2:
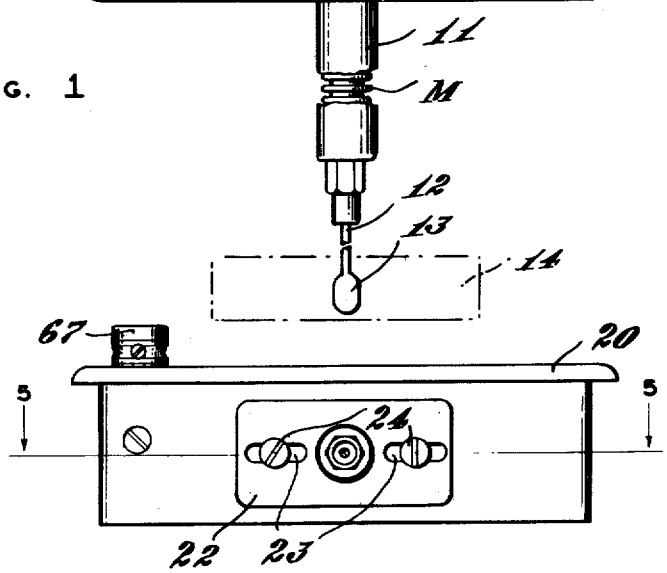
Fig. 2 is a bottom view of the instrument shown in Fig. 1, but omitting the bulb.
Figure 6:
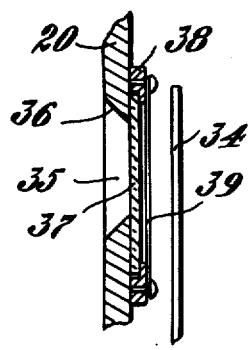
Fig. 6 is a fragmentary vertical section, to larger scale, on the line 6—6 of Fig. 1, omitting many of the parts.

A vertically reciprocable rod 43 (Figs. 4 and 7) is arranged to slide up and down in bearing openings provided in the upper and lower walls of the hollow block 29. Preferably this rod 43 is provided, at one or both ends, here shown as at both ends, with length-adjusting means 44ª and 44ᵇ respectively, the lower length-adjusting member 44ᵇ here being shown as resting upon the upper surface of the lever 27. Within the hollow block 29 the rod 43 is provided with a series of rack teeth 45 (Fig. 7) which engage a pinion 46 mounted on a horizontal staff 33 which is journaled at its rear in a bearing in the rear wall of the block 29 and forwardly of the pinion 46 in a bearing in a removable cover plate 32 forming the front of the hollow block 29. At its forward end the staff 33 carries the dial disk 34, the forward face of which is provided with graduations which indicate variations in the condition of the medium to which the instrument is to respond, for example, to temperature variations. The location of the staff 33 is such that, as shown in Fig. 1, a graduated portion of the dial 34 is visible through a slight opening 35 in the front wall 20 of the casing. As shown in Fig. 6, the margins 36 of the sight opening 35 are beveled, thereby to reduce parallax when observing the dial from one side of the cover of the instrument, the opening 35 being closed at the inside of the instrument case by a plate 37 of transparent material, for example glass, held in place by a frame 38 secured to the cover 20. Extending vertically across the plate 37, to the rear of the latter, there is arranged a fine wire or fiber 39 constituting an index element for cooperation with the graduations on the dial 34, whereby the instant temperature, pressure or the like may be visually observed. Instead of a wire, a pointer may be attached to the rear side of the cover 20 so as to be visible through the plate 37, or the latter may have a scratch or line etched on its rear surface. A hair spring 46 (Figs. 4 and 7) encircling the staff 33, is so arranged as to tend to move the rod 43 downwardly and thus insure contact of its lower end with the lever 27.

Figure 8:
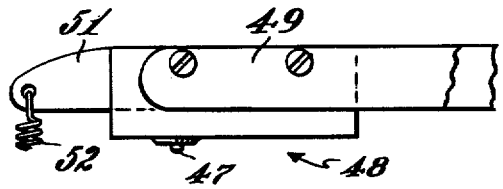
Fig. 8 is a fragmentary front elevation, to larger scale than Fig. 4, showing a portion of the electrical switch and the means for supporting it.

Within the upper part of the casing there is arranged a switch supporting frame 49 (Figs. 4 and 8) which is pivoted to rock up and down about the axis of a shoulder screw 50 having threaded engagement with the rear wall of the casing. This frame 49 supports the casing of a switch 48 which makes and breaks an electrical circuit supplying current to the apparatus which is to be controlled. This switch 48, as here illustrated, is of the snap-action type having a sliding actuating pin 47. The switch supporting frame 49 is so arranged that when the switch 48 is within its normal range of bodily movement the pin 47 is in substantial axial alignment with the vertically reciprocable rod 43, it being noted that although the switch rocks about the axis of the screw 50, the arc of motion is so small that the alignment of the pin 47 and the rod 43 is sufficiently accurate for the purpose. Thus the lower end of the pin 47 is always directly above the adjustment member 44ª forming the upper end of the rod 43.

The switch supporting frame 49 has an extension 51 (Figs. 4 and 8) to which the upper end of a coiled tension spring 52 is connected, the lower end of the spring being secured to a screw 53 (Fig. 4) projecting from the rear wall of the casing. This spring thus tends to swing the switch supporting frame 49 in a counterclockwise direction, that is to say, to move the pin 47 downwardly toward the upper end of the rod 43. For limiting this movement there is provided an adjustable stop in the form of a button 54 which underlies the lower edge of the extension 51 and which is carried by a vertically slidable bar 55 (Figs. 3 and 4) which slides in a guide groove formed in the rear surface of the block 29 (Fig. 9), the left-hand edge of the bar 55 being provided with a series of rack teeth 57. The block 29 has an extension 29ª (Figs. 4 and 9), at its lower part at its left-hand side, provided with a bearing bore 58 which receives the rear end portion of a rotary staff 59 (Fig. 9) whose rear end is provided with a pinion 60 which meshes with the rack teeth 57. To prevent the bar 55 from moving out of the slot in the block 29, there is provided a retaining screw 56 whose head overlaps the left-hand margin of the bar 55. At its forward end the staff 59 carries a toothed gear disk 61 whose forward face is graduated to form a second rotary dial, the staff 59 being so located that a graduated portion of this dial is visible through a second sight opening 62 (Fig. 1) formed in the front plate 20, this sight opening 62 having beveled edges like the opening 35 and having a transparent closure at its rear face and being provided with an index pointer or wire 63 for cooperation with the graduations. The toothed edge of the gear disk 61 meshes with a pinion 65 (Fig. 3) mounted on a normally stationary staff 66 which turns in suitable bearings provided within the casing and whose forward end projects out through an opening in the front member 20 of the casing, the outer end of this staff 66 being provided with a knob or handle 67 by means of which it may be turned. A box C is here shown as mounted on the top of the instrument face 60 for the accommodation of suitable connections whereby an electrical cable B may be properly fixed and positioned so that its conductor wires may be properly connected to the terminals of the switch 48.

At the time of manufacture and after the instrument has been assembled and the cover 20 put in place but before the screws 24 have been tightened, the bulb 13 is subjected to predetermined conditions, and the resultant reading of the dial 34 through the opening 35 is observed. The flange 22 may thus be shifted laterally, either to the right or left, thus shifting the point of contact of the rod 26 toward or from the fulcrum axis of the lever 27, such movement of the flange in one direction or the other being continued until a correct reading is observed at the opening 35. The screws 24 are now tightened, thus completing the calibration of the instrument with respect to the particular motor assembly which is being used, such motor assembly including the motor device M, the connecting tube 12 and the bulb or its equivalent 13.

After the instrument has been installed at such distance from the location of the bulb 13 as may be desired, the user may set the instrument to respond to a given condition by turning the knob 67 while observing the graduations on the dial 61 through the opening 62. The mere turning of the knob 67 not only turns the dial 61 but it also moves the bar 55 upwardly or downwardly, thus changing the location of the stop 54 and in this way determining the initial position of the lower end of the switch actuating pin 47.

Assuming now, for example, that the motor device M expands in response to a temperature increase at the location of the bulb 13, the motion transmitting rod 26 will rise, thus rocking the lever 27 in a clockwise direction and in this way raising the reciprocable rod 43. If this movement continues, the upper end of the rod 43 will eventually contact the pin 47 and thus open or close the switch circuit (depending upon the type of switch employed) and thus set into operation apparatus whose action may eventually be expected to change the conditions at the location of the bulb 13 so that the motion of the rod 43 will cease or may be reversed, the retraction of the upper end of rod 43 from the pin 47 permitting the switch to snap in the opposite direction. If, during the normal operation of the instrument, the ambient conditions in the vicinity of the instrument case should change from a predetermined normal, the compensating motor device 41 will raise or lower the block 29, thus bodily moving the staff 33 up or down and thus, by the engagement of the pinion 46 with the then stationary rack teeth 45, cause the dial 34 to turn so as to adjust the dial to compensate for the abnormal ambient conditions at the location of the instrument. At the same time the movement of block 29 moves the staff 59 up or down, so that the pinion 60 tends to roll along rack teeth 57. However, since the toothed disk 61 fixed to the staff 59 meshes with the normally stationary pinion 65, the movement of the block 29 results in a corresponding movement of bar 55 and adjustment of stop button 54, thus providing a compensating adjustment of the switch pin 47. Thus the instrument will provide correct indications regardless of changes in conditions at the location of the instrument itself.

While one desirable embodiment of the invention has been shown and described by way of example, it is to be understood that the invention is broadly inclusive of any and all modifications falling within the scope of the appended claims.

I claim:

1. A control instrument of the class described comprising a casing having a front wall provided with a sight opening and a fixed index element extending transversely of said opening, a rotatable, graduated dial within the casing, a staff on which the dial is mounted and whose axis is perpendicular to the front wall of the casing, the staff being so located that a graduated portion of the dial is visible through the opening in the front wall, spring means tending to turn the dial staff in one direction, an electrical switch within the casing, motor means, a pinion fixed to the dial staff, a reciprocable bar which has rack teeth meshing with the pinion, means for transmitting motion from the motor means to the reciprocable bar, and means carried by the bar for operating the switch.

2. A control instrument according to claim 1 wherein the means for transmitting motion from the motor means to the reciprocal bar comprises an elongate lever fulcrumed to rock about an axis in a plane perpendicular to the length of said bar, and so located that the lower end of the bar rests upon the upper side of the lever, and a reciprocal rigid rod whose longitudinal axis is parallel to that of said bar and which is so arranged that its upper end contacts the end side of the lever, said rod being actuable by the motor means, and means whereby the longitudinal axes of the bar and rod may be moved relatively toward or from each other.

3. A control instrument according to claim 2 wherein the motor means is a bellows device disposed outside of the casing and with its axis aligned with that of said reciprocal rod, the bellows having a movable head connected to the lower end of said rod, the rod entering the casing through an aperture in the casing wall, a housing for the bellows, having a guide for the rod, and means for adjustably attaching the housing to the casing whereby the axis of the rod may be moved toward and from the axis of the reciprocal bar.

4. A control instrument comprising a casing having a front wall provided with a sight opening and a fixed index element extending transversely of said sight opening, a rotatable, graduated dial within the casing, a staff on which the dial is mounted and whose axis is perpendicular to the front wall of the casing, the staff being so located that a graduated portion of the dial is visible through the sight opening in the front wall, spring means tending to turn the dial staff in one direction, a control device within the casing, the control device having a movable part, motor means, a pinion fixed to the dial staff, a reciprocable bar having rack teeth which mesh with the pinion, means for transmitting motion from the motor means to the reciprocable bar, means carried by the bar for operating the movable part of the control device, the means for transmitting motion from the motor means to the reciprocable bar comprising an elongate lever fulcrumed to rock about an axis in a plane perpendicular to the length of the bar, one end of the bar resting on the lever and the other end of the bar being contactable with said movable part of the control device, the motor means comprising a part which engages the lever whereby to rock the latter, and means for shifting the point of engagement of said last-named part with the lever toward and from the axis of the lever.

5. A control instrument comprising a casing having a front wall provided with a sight opening and a fixed index element visible at said sight opening, a rotatable, graduated dial within the casing, a staff on which the dial is mounted and whose axis is perpendicular to the front wall of the casing, the staff being so located that a graduated portion of the dial is visible through the opening in the front wall, spring means tending to turn the dial staff in one direction, an electrical switch within the casing, the switch having a movable actuating pin, motor means, a pinion fixed to the dial staff, a reciprocable bar having rack teeth which mesh with the pinion, means carried by the bar for operating the switch, means transmitting motion from the motor means to the reciprocable bar, a switch-carrying lever pivotally supported within the casing to rock about an axis perpendicular to the front wall of the casing, means fixing the switch to said switch-carrying lever, spring means urging the switch-carrying lever in a direction to contact the switch-actuating pin with the end of the reciprocable bar, and adjustable stop means for limiting motion of the switch-carrying lever in said direction.

6. A control instrument of the class described, comprising a casing having a front wall provided with sight openings therein, a fixed element extending transversely across each sight opening, rotary graduated dials within the casing mounted on parallel staffs, the axis of each staff being perpendicular to the front wall of the casing, the respective staffs being so located that graduated portions of the respective dials are visible through the respective sight openings, an adjustable control device within the casing, motor means operative to actuate the control device and also to turn the staff on which one of said dials is mounted, manually operable means for so adjusting the control device that it will only be actuable by the motor means under certain predetermined conditions, and motion transmitting means operative to turn the staff of the other dial concomitantly with the adjustment of said control device.

7. A control instrument according to claim 6, wherein the fixed index elements are in planes close to the graduated faces of the respective dials, the sight openings having beveled margins and increasing in area from the inside to the outside of the front wall of the casing.

8. A control instrument according to claim 6, comprising automatically acting means within the casing for adjusting the dial and control device to compensate for fortuitous temperature variations which might affect the accuracy of the instrument.

9. A control instrument of the class described, comprising a casing having therein an electrical switch comprising an actuating element, a movable part normally spaced from said actuating element, motor means for bringing said movable part into operative engagement with the actuating element of the switch, manually operable adjusting means for determining the normal spacing of the actuating element from said movable part, a rotary graduated dial within the casing which turns in timed relation with said manually operable adjusting means, the wall of the casing having a sight opening through which a graduated portion of said rotary dial is visible, a fixed index element extending across said sight opening for cooperation with the graduations on the dial, the switch being of the snap action type and the actuating element being a reciprocable pin and said movable part being a reciprocable rod coaxial with the pin, a movable support for the switch, spring means tending to move the support thereby to engage the switch pin with the end of said reciprocable rod, and an adjustable stop constituting an element of said manually operable adjusting means for limiting movement of the switch support.

10. A control instrument of the class described, comprising a casing having therein an electrical switch having an actuating element, a movable part normally spaced from said actuating element, motor means for bringing said movable part into operative engagement with the actuating element of the switch, manually operable adjusting means for determining the normal spacing of the actuating element from said movable part, a rotary graduated dial within the casing which turns in timed relation with said manually operable adjusting means, the wall of the casing having a sight opening through which a graduated portion of said rotary dial is visible, a fixed index element extending across said sight opening for cooperation with the graduations on the dial, the switch being of the snap action type, the actuating element being a reciprocable pin and said movable part being a reciprocable rod coaxial with the pin, a movable support for the switch, spring means tending to move the support thereby to engage the switch pin with the end of said reciprocable rod, and an adjustable stop constituting an element of said manually operable adjusting means for limiting movement of the switch support, the movable stop being carried by a reciprocable bar provided with rack teeth, a pinion meshing with said teeth, a staff on which the pinion is mounted and to which the graduated dial is fixed, the manually operable adjusting means comprising means for turning said staff.

11. A control instrument of the class described, comprising a casing having therein an electrical switch having an actuating element, a movable part normally spaced from said actuating element, motor means for bringing said movable part into operative engagement with the actuating element of the switch, manually operable adjusting means for determining the normal spacing of the actuating element from said movable part, a rotary graduated dial within the casing which turns in timed relation with said manually operable adjusting means, the wall of the casing having a sight opening through which a graduated portion of said rotary dial is visible, a fixed index element extending across said sight opening for cooperation with the graduations on the dial, the switch being of the snap action type, the actuating element being a reciprocable pin and said movable part being a reciprocable rod coaxial with the pin, a movable support for the switch, spring means tending to move the support thereby to engage the switch pin with the end of said reciprocable rod, and an adjustable stop constituting an element of said manually operable adjusting means for limiting movement of the switch support, the graduated dial being fixed to a toothed gear, a pinion meshing with said gear, a manually operable adjusting means comprising a handle for turning the pinion, and means moving with the gear for adjusting the stop.

12. A control instrument of the class described, comprising a casing having therein an electrical switch comprising an actuating element, a movable part normally spaced from said actuating element, motor means for bringing said movable part into operative engagement with the actuating element of the switch, manually operable adjusting means for determining the normal spacing of the actuating element from said movable part, a rotary graduated dial within the casing which turns in timed relation with said manually operable adjusting means, the wall of the casing having a sight opening through which a graduated portion of said rotary dial is visible, a fixed index element extending across said sight opening for cooperation with the graduations on the dial, the switch being of the snap action type, the actuating element being a reciprocable pin and said movable part being a reciprocable rod coaxial with the pin, a pivoted support for the switch, spring means tending to move the support thereby to engage the switch pin with the end of said reciprocable rod, and an adjustable stop constituting an element of said manually operable adjusting means for limiting movement of the switch support, the movable stop being carried by a reciprocable bar provided with rack teeth, a staff having a pinion which meshes with said rack teeth, the staff also having fixed thereto a toothed gear fixed relatively to and in coaxial relation to the graduated dial, a second staff journaled within the casing and having an end which projects outwardly through an opening in the wall of the casing, a handle fixed to the exposed end of said staff and a pinion fixed to the latter staff and which meshes with the teeth of the gear associated with the rotary dial.

References Cited in the file of this patent

UNITED STATES PATENTS

| | | |
|---|---|---|
| 1,430,174 | Marchus | Sept. 26, 1922 |
| 2,045,959 | Partlow | June 30, 1936 |
| 2,063,613 | McCarthy | Dec. 8, 1936 |
| 2,315,212 | Kronmiller | Nov. 30, 1943 |
| 2,464,944 | Rosche | Mar. 22, 1949 |
| 2,535,202 | Gregory | Dec. 26, 1950 |
| 2,562,385 | Marcellus | July 31, 1951 |

UNITED STATES PATENT OFFICE

CERTIFICATE OF CORRECTION

Patent No. 2,797,272                                        June 25, 1957

Henry G. Leupold

It is hereby certified that error appears in the printed specification of the above numbered patent requiring correction and that the said Letters Patent should read as corrected below.

Column 6, line 19, for "end", second occurrence, read -- under --.

Signed and sealed this 10th day of September 1957.

(SEAL)
Attest:

KARL H. AXLINE
Attesting Officer

ROBERT C. WATSON
Commissioner of Patents